E. TOWN.
Screw-Propeller.

No. 199,126. Patented Jan. 8, 1878.

Attest:
H. L. Purviue
A. Scott

Edwin Town.
Inventor.
By Chs. Parks
Atty.

UNITED STATES PATENT OFFICE.

EDWIN TOWN, OF WILMINGTON, DELAWARE.

IMPROVEMENT IN SCREW-PROPELLERS.

Specification forming part of Letters Patent No. 199,126, dated January 8, 1878; application filed September 1, 1877.

*To all whom it may concern:*

Be it known that I, EDWIN TOWN, of the city of Wilmington, county of New Castle, and State of Delaware, propose to make a screw-propeller of two, three, or more blades, which together are equal (by measurement) in area to that of a disk of the same diameter, to obtain as much surface as possible, and shaped, by extending the blades circumferentially forward and backward relatively, to the rotation of the wheel, in a form, first, lineally, approximating to that of the wing of a bird, but, second, as to their surface, strictly spiral throughout; and, third, having a peculiar addition at their crests or butts, as a means of increasing their propulsive action.

Figure 1:
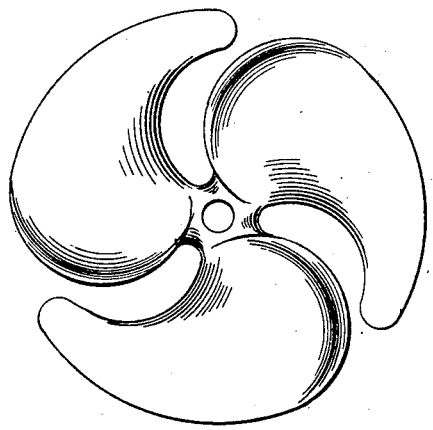
Figure 2:
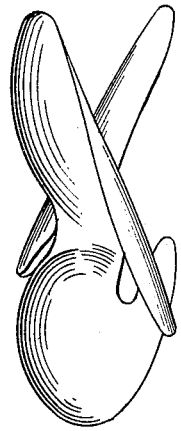
Figure 3:
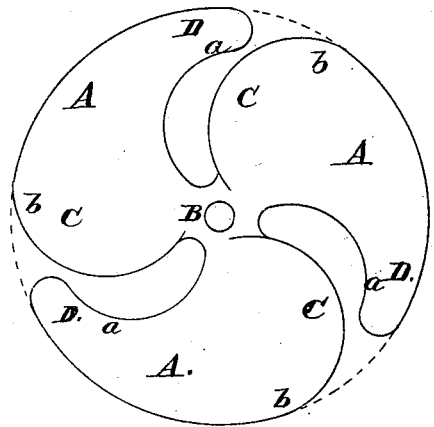

A, Figure 3, represents the blades, which radiate from their center B, and extend forward of the junction with the center, as represented at C, backward, as at D, speaking relatively as to the rotation of the wheel. These wings or blades are arranged spirally to the shaft, as others are, to produce the strictly screw form. The rear edge *a* of one blade reaches the front edge *b* of the one in advance of it, or nearly so, and they are divided on the lines *d*, beginning near the center, and terminating at the periphery, and so shaped, as to the curvature, that the form of the front edges of the blades is adapted for advancing the water easily and smoothly, while the rear edges are similarly adapted for the water to escape from the blades. This form for the blades allows of using (as proved by actual measurement) the whole area of the disk for acting upon the water without any undue increase of friction, while the prolonged extensions D are specially adapted for continued action upon the water retreating or thrown off by the rear portion C and middle portion A of the wing or blade.

In the common form of propellers it is found that the blades or flanges embrace, as to their surface, only about three-fifths of the area of a disk of the same diameter. My wheel, having two-fifths more of surface, would, therefore, theoretically, have the same additional efficiency over other wheels. But, in practice, or as determined by actual experiment, this difference, owing to the friction of the water acting obliquely upon the surfaces of the flanges or blades, is considerably reduced, and yet the efficiency of my wheel (as proved by repeated trials) is from one-fifth to one-third, or, on an average, over one-fourth greater than that of any other good wheel, so far found and tested. These lines and surfaces, as described, and seen in the drawings, represent the wings or blades as to their lineal form, being that of a bird's wing, while, as to their surfaces, they have two peculiarities not found in other propellers; and the first is, that the general surface of the blades, extending from the tip of the wing to the base of the crest, is strictly and truly spiral as to form, so that a uniform body of water, varying from the perpendicular to any angle that may be thought best, is thrown from the surface of the wing or blade, thus securing efficiency of action, as well as avoiding the agitation of the water, so common to all other forms of propellers. The second peculiarity of the wings or blades of my propeller is their having slight curves on their crests or butts, which has the effect to collect or retain the water thrown from the periphery, and to deliver it in a more compact column in a direction parallel to its axis, thus (as proved by actual experiment) adding one-tenth to the propulsive power of the wheel, as well as utilizing thereby an amount of water thrown by the wheel equal in area to that of a disk of the same diameter.

Having thus described my invention, what I now claim as new, and desire to secure by Letters Patent, is—

1. A wheel whose wing-shaped and strictly spiral flanges embrace, as to their combined surfaces, an area equal to the whole disk or diameter of the wheel.

2. A wheel having wing-shaped spiral flanges, slightly extended in their crested extremities by curved concave butts or lip-formed additions, substantially as described.

EDWIN TOWN.

Witnesses:
E. B. FRAZER,
HENRY KUFER.